United States Patent
Challener et al.

(10) Patent No.: US 6,754,826 B1
(45) Date of Patent: Jun. 22, 2004

(54) DATA PROCESSING SYSTEM AND METHOD INCLUDING A NETWORK ACCESS CONNECTOR FOR LIMITING ACCESS TO THE NETWORK

(75) Inventors: David Carroll Challener, Raleigh, NC (US); Daryl Carvis Cromer, Cary, NC (US); Dhruv M. Desai, Cary, NC (US); Brandon Jon Ellison, Raleigh, NC (US); Howard Locker, Cary, NC (US); Andy Lloyd Trotter, Raleigh, NC (US); James Peter Ward, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,713

(22) Filed: Mar. 31, 1999

(51) Int. Cl.[7] .............................. H04L 9/32; G06F 15/16
(52) U.S. Cl. ....................... 713/182; 713/155; 713/182; 713/201; 380/25; 380/30; 709/229; 370/233; 370/241; 370/329; 370/401
(58) Field of Search .................................. 713/182, 155, 713/201; 709/229; 380/25–30; 370/401, 233, 329, 241

(56) References Cited

U.S. PATENT DOCUMENTS

| | | | | |
|---|---|---|---|---|
| 4,430,728 A | * | 2/1984 | Beitel et al. | 364/900 |
| 4,604,499 A | * | 8/1986 | Hughes | 179/2 |
| 4,679,226 A | * | 7/1987 | Muehleisen | 379/95 |
| 4,707,804 A | * | 11/1987 | Leal | 340/825.33 |
| 5,720,035 A | * | 2/1998 | Allegre et al. | 395/200.06 |
| 5,778,071 A | * | 7/1998 | Caputo et al. | 380/30 |
| 5,852,653 A | * | 12/1998 | Reel et al. | 379/88 |
| 6,067,620 A | * | 5/2000 | Holden et al. | 713/155 |
| 6,088,451 A | * | 7/2000 | He et al. | 380/25 |
| 6,311,218 B1 | * | 10/2001 | Jain et al. | 709/229 |

OTHER PUBLICATIONS

M2 Communications, Extreme networks eliminates costly upgrades with industry's first fixed 48–port switch . . . , M2 Presswire Coventry, Feb. 2, 20004, p. 1.*

* cited by examiner

*Primary Examiner*—Ayaz Sheikh
*Assistant Examiner*—Taghi T. Arani
(74) *Attorney, Agent, or Firm*—Dillon & Yudell, LLP (57) ABSTRACT

A data processing system and method are disclosed for providing an access connector which limits access to a network to only authorized client computer systems. The network is controlled by a server computer system. The access connector is provided for physically coupling a client computer system to the network. The access connector is physically coupled to the network. Prior to permitting the client computer system to attempt to establish a client communication link with the network, the client computer system attempts to authenticate itself to the server computer system. In response to the client computer system being unable to authenticate itself to the server computer system, the access connector prohibits the client computer system from establishing a client communication link between the client computer system and the network.

23 Claims, 5 Drawing Sheets

DATA PROCESSING SYSTEM AND METHOD INCLUDING A NETWORK ACCESS CONNECTOR FOR LIMITING ACCESS TO THE NETWORK

BACKGROUND OF THE INVENTION

1. Field of the Invention

The present invention relates in general to data processing systems and, in particular, to a data processing system and method including an access connector for limiting access to a network. Still more particularly, the present invention relates to a data processing system and method including an access connector for limiting access to a network to only authorized client computer systems.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC 300 series, Aptiva series, and Intellistation series.

A business may establish a secure network. The secure network provides for secure transmission of data. All computer systems included within the secure network may freely establish a communication link with the network, and may freely attempt to log-on to the network. Access to the secure network is provided only within company buildings, or transmission between buildings over dedicated or leased lines.

The secure network may be protected by a firewall. The firewall provides an access point to external systems to the network. Computer systems included inside the firewall are permitted to establish a communication link with the network, and may view network traffic. Computer systems outside the firewall do not have direct access to the network. Access to the network by external computer systems is controlled by the firewall.

However, there may exist access points to the network inside the firewall which need to be secured. For example, a company may provide a network access point in the company's lobby which is located inside the firewall. Anyone having access to the lobby could access the network to view network traffic.

Encryption algorithms are known to ensure that only the intended recipient of a message can read and access the message. One known encryption algorithm is an asymmetric, or public key, algorithm. The public key algorithm is a method for encrypting messages sent from a first computer system to a second computer system. This algorithm provides for a key pair including a public key and a private key for each participant in a secure communication. This key pair is unique to each participant. Examples of such an encryption scheme are an RSA key pair system, and a secure sockets layer (SSL) system.

Therefore a need exists for a data processing system and method for providing an access connector which limits access to a network to only authorized client computer systems.

SUMMARY OF THE INVENTION

A data processing system and method are disclosed for providing an access connector which limits access to a network to only authorized client computer systems. The network is controlled by a server computer system. The access connector is provided for physically coupling a client computer system to the network. The access connector is physically coupled to the network. Prior to permitting the client computer system to attempt to establish a client communication link with the network, the client computer system attempts to authenticate itself to the server computer system. In response to the client computer system being unable to authenticate itself to the server computer system, the access connector prohibits the client computer system from establishing a client communication link between the client computer system and the network.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawigns, wherein:

DETAILED DESCRIPTION OF A PREFERRED EMBODIMENT

A preferred embodiment of the present invention and its advantages are better understood by referring to FIGS. 1–5 of the drawings, like numerals being used for like and corresponding parts of the accompanying drawings.

The present invention is a method and system for providing an access connector which limits access to a network to only authorized client computer systems. The access connector is provided for physically coupling a client to the network. Prior to permitting the client to attempt to establish a communication link with the network, the client attempts to authenticate itself to the server computer system which controls the network. If the client is unable to authenticate itself to the network, the access connector prohibits a communication link between the client and the network.

The access connector includes a client switch, a network switch, and a service processor. The client switch is capable of prohibiting a client communication link between the client and the access connector when the client switch is open. The network switch is capable of prohibiting a network communication link between the network and the access connector when the network switch is open. The service processor controls the opening and closing of the client and network switches. In order for the client to attempt to establish a communication link between the client and the network, both the client switch and the network switch must be closed.

A communication link is established between two devices when the devices are coupled together in some manner and the devices are able to transmit data to each other. Once a communication link is established between a server and a client, the client may attempt to log-on to the server's network. If the client successfully logs-on to the network, an application link is established between the client and the network. Only when an application link is established, the client may access the network and its resources.

In the present invention, in response to the initiation of operation of the network, the access connector attempts to authenticate itself to the network. If the access connector is unable to authenticate itself to the network, the service processor within the access connector prohibits a network communication link between the access connector and the network by opening the network switch.

Each client is associated with a unique client identifier which identifies the particular client. The access connector is associated with a unique access connector identifier which identifies the particular access connector. When the client needs to log-on to the secure network, the client first encrypts the client's unique identifier using the client's private key, thus creating a client signature. A certificate which associates the client's public key and the client identifier is then appended to the client signature. The combination of client signature and client certificate are then encrypted using the server public key to create an encrypted client packet.

The access connector intercepts the encrypted client packet and signs the client packet by encrypting it using the access connector's private key. An access connector certificate, which associates the access connectors public key and access connector identifier, is appended to the access connector's signature. The access connector's signature is created by encrypting the encrypted client packet with the access connector's private key. The combination of access connector signature and access connector public key are then encrypted using the server public key to create an access connector packet. The access connector then forwards the access connector packet to the server.

The server decrypts the access connector packet with the server's private key. The server then verifies the access connector signature using the public key of the access connector from the access connector certificate. The server decrypts the client packet with the server private key. The server then verifies the client signature using the public key of the client from the client certificate. The server then determines if the client using this path through the access connector is acceptable. Next the server determines whether or not the particular client is permitted to establish a communication link and attempt to log-on to the network. The server transmits an approval or disapproval to the client which is intercepted by the access connector. If the link is approved, the access connector will pass all messages through between the client and the server without further encrypting them. However, if the link is disapproved, the service processor within the access connector causes the client switch to be open.

The unique identifiers are stored in protected storage within either the client or access connector. The protected storage is one-time-writable storage. The ability to tamper with the unique identifier is substantially reduced.

Figure 1:
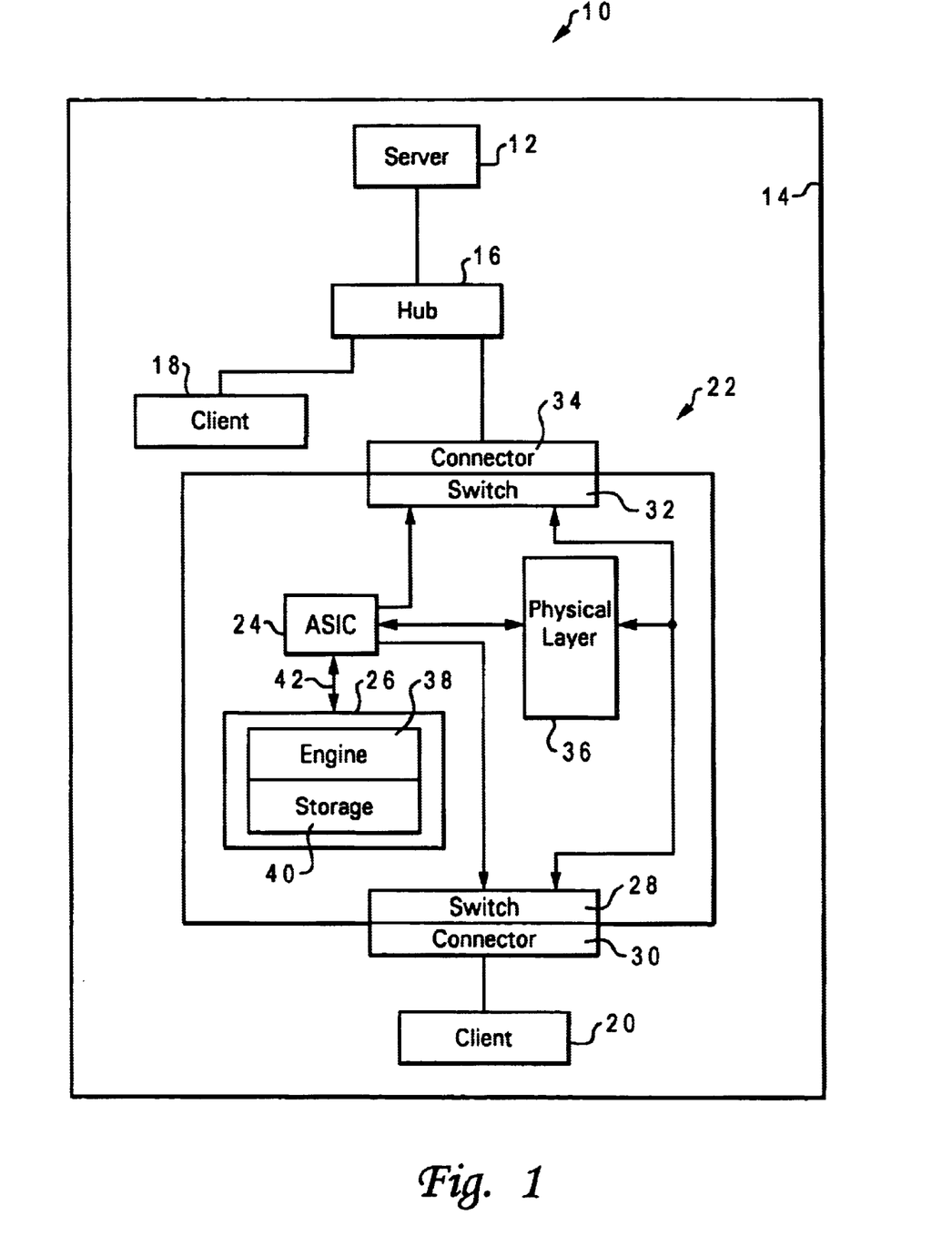
FIG. 1 illustrates a pictorial representation of a network including an access connector for coupling client computer systems to the network in accordance with the method and system of the present invention.

FIG. 1 illustrates a pictorial representation of a network including an access connector for coupling client computer systems to the network in accordance with the method and system of the present invention. Network 10 is controlled by server computer system 12, and is protected by a firewall 14. Server 12 is coupled to a plurality of client computer systems utilizing a hub 16. A client computer system may be coupled directly to hub 16, such as client computer system 18. When access to network 10 is provided in an non-secure area inside the firewall, a client computer system 20 is coupled to network 10 utilizing an access connector 22.

Access connector 22 includes a service processor 24 coupled to an encryption device 26, a client switch 28 coupled to client 20 utilizing a connector 30, a network switch 32 coupled to hub 16 utilizing connector 34, and a physical layer 36 for coupling switches 28 and 32 to service processor 24.

Encryption device 26 includes an encryption/decryption engine 38 and protected storage 40. Encryption/decryption engine 38 which includes an encryption/decryption algorithm which is utilized to encode and decode messages transmitted and received by access connector 22, and protected storage 40. Engine 38 can preferably perform public\private key encryption. Engine 38 may access a protected storage device 40. Protected storage device 40 is accessible only through engine 38, and is a one-time writable device. Access connector's 22 unique identifier and its encryption key pair are stored within storage 38. Device 26 may be implemented utilizing an electronically erasable storage device, such as an EEPROM. Access may be gained to non-readable storage device 26 in order to initially store the access connector private key. However, after the access connector private key is stored, it cannot be read.

Encryption device 26 is coupled to service processor 24 utilizing a system management (SM) bus 42. System management bus 42 is a two-wire, low speed, serial bus used to interconnect management and monitoring devices.

Physical layer 36 conditions analog signals to go out to network 10 through switches 28 and 32 and R45 connectors 30 and 34. Physical layer 234 may be a fully integrated device supporting 10 and 100 Mbps CSMA/CD Ethernet applications.

Figure 2:
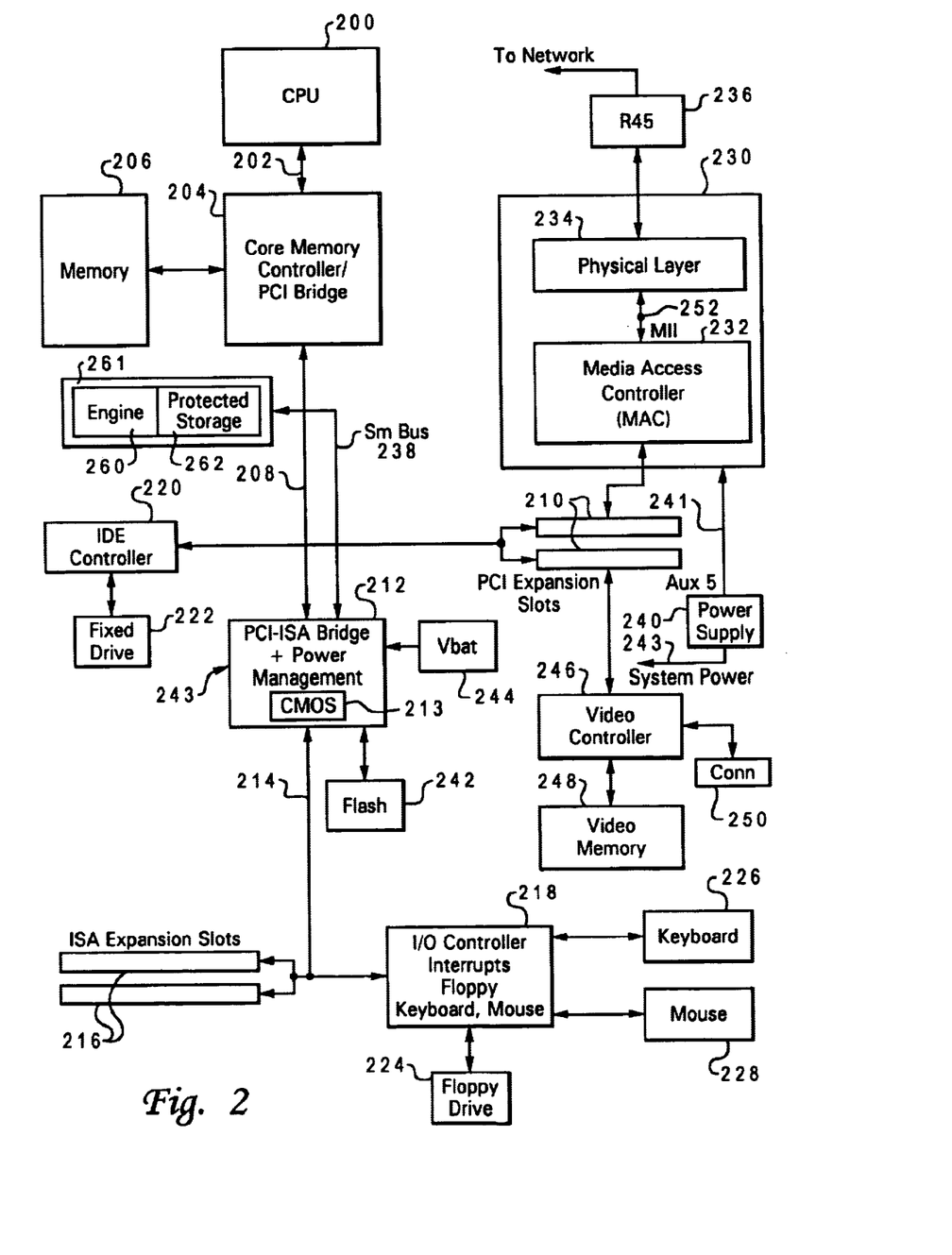
FIG. 2 depicts a more detailed pictorial representation of a client computer system in accordance with the method and system of the present invention.

FIG. 2 depicts a more detailed pictorial representation of a client computer system in accordance with the method and system of the present invention. Client computer system 20 includes a planar (also commonly called a motherboard or system board) which is mounted within client 20 and provides a means for mounting and electrically interconnecting various components of client 20 including a central processing unit (CPU) 200, system memory 206, and accessory cards or boards as is well known in the art.

CPU 200 is connected by address, control, and data busses 202 to a memory controller and peripheral component interconnect (PCI) bus bridge 204 which is coupled to system memory 206. An integrated drive electronics (IDE) device controller 220, and a PCI bus to Industry Standard Architecture (ISA) bus bridge 204 are connected to PCI bus bridge 204 utilizing PCI bus 208. IDE controller 220 provides for the attachment of IDE compatible storage devices, such a removable hard disk drive 222. PCI/ISA bridge 212 provides an interface between PCI bus 208 and an optional feature or expansion bus such as the ISA bus 214. PCI/ISA bridge 212 includes power management logic. PCI/ISA bridge 212 is supplied power from battery 244 to prevent loss of configuration data stored in CMOS 213.

A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

An I/O controller 218 is coupled to PCI-ISA bridge controller 212. I/O controller 218 controls communication between PCI-ISA bridge controller 212 and devices and peripherals such as floppy drive 224, keyboard 226, and mouse 228 so that these devices may communicate with CPU 200.

PCI-ISA bridge controller 212 includes an interface for a flash memory 242 which includes an interface for address, data, flash chip select, and read/write. Flash memory 242 is an electrically erasable programmable read only memory (EEPROM) module and includes BIOS that is used to interface between the I/O devices and operating system.

Computer system 20 includes a video controller 246 which may, for example, be plugged into one of PCI expansion slots 210. Video controller 246 is connected to video memory 248. The image in video memory 248 is read by controller 246 and displayed on monitor (not shown) which is connected to computer system 20 through connector 250.

Computer system 20 includes a power supply 240 which supplies full normal system power 243, and has an auxiliary power main AUX 5 241 which supplies full time power to the power management logic 212.

In accordance with the present invention, the planar includes an encryption device 261 which includes an encryption/decryption engine 260 which includes an encryption/decryption algorithm which is utilized to encode and decode messages transmitted and received by the planar, and protected storage 262. Engine 260 can preferably perform public\private key encryption. Engine 260 may access a protected storage device 262. Protected storage device 262 is accessible only through engine 260. Storage device 262 cannot be read or written to by other planar devices. The client's unique identifier and its encryption key pair are stored within storage 262. Everything stored in storage 262 is protected by engine 260 and is not accessible to the planar or its components. Device 262 may be implemented utilizing an electronically erasable storage device, such as an EEPROM. Access may be gained to non-readable storage device 262 in order to initially store the client private key. However, after the client private key is stored, it cannot be read or written by other planar devices. The keys stored in EEPROM 262 may not be read by any component of the planar other than engine 260.

Encryption device 261, including engine 260 and EEPROM 262, is coupled to PCI-ISA bridge 212 utilizing a system management (SM) bus 238. System management bus 238 is a two-wire, low speed, serial bus used to interconnect management and monitoring devices. Those skilled in the art will recognize that encryption device 261 may be coupled to another bus within the planar.

Client 20 also includes a network adapter 230. Network adapter 230 includes a physical layer 234 and a media access controller (MAC) 232 coupled together utilizing a Media Independent Interface (MII) bus 252. The MII bus 252 is a specification of signals and protocols which define the interfacing of a 10/100 Mbps Ethernet Media Access Controller (MAC) 232 to the underlying physical layer 234. Network adapter 230 may be plugged into one of the PCI connector slots 210 (as illustrated) or one of the ISA connector slots 216 in order to permit client 20 to communicate with server 12 utilizing a communication link.

MAC 232 processes digital network signals, and serves as an interface between a shared data path, i.e. the MII bus 252, and the PCI bus 208. MAC 232 performs a number of functions in the transmission and reception of data packets. For example, during the transmission of data, MAC 232 assembles the data to be transmitted into a packet with address and error detection fields. Conversely, during the reception of a packet, MAC 232 disassembles the packet and performs address checking and error detection. In addition, MAC 232 typically performs encoding/decoding of digital signals transmitted over the shared path and performs preamble generation/removal, as well as bit transmission/reception. In a preferred embodiment, MAC 232 is an Intel 82557 chip. However, those skilled in the art will recognize that the functional blocks depicted in network adapter 230 may be manufactured utilizing a single piece of silicon.

Physical layer 234 operates in a manner similar to physical layer 36. Physical layer 234 conditions analog signals to go out to the network via an R45 connector 236. Physical layer 234 may be a fully integrated device supporting 10 and 100 Mbps CSMA/CD Ethernet applications. Physical layer 234 receives parallel data from the MII local bus 252 and converts it to serial data for transmission through connector 236 and over network 10. Physical layer 234 is also responsible for wave shaping and provides analog voltages to network 10. In a preferred embodiment, physical layer 234 is implemented utilizing an Integrated Services chip ICS-1890.

Physical layer 234 includes auto-negotiation logic that serves three primary purposes. First, it determines the capabilities of client 20. Second, it advertises its own capabilities to server 12. And, third, it establishes a connection with server 12 using the highest performance connection technology.

Figure 3:
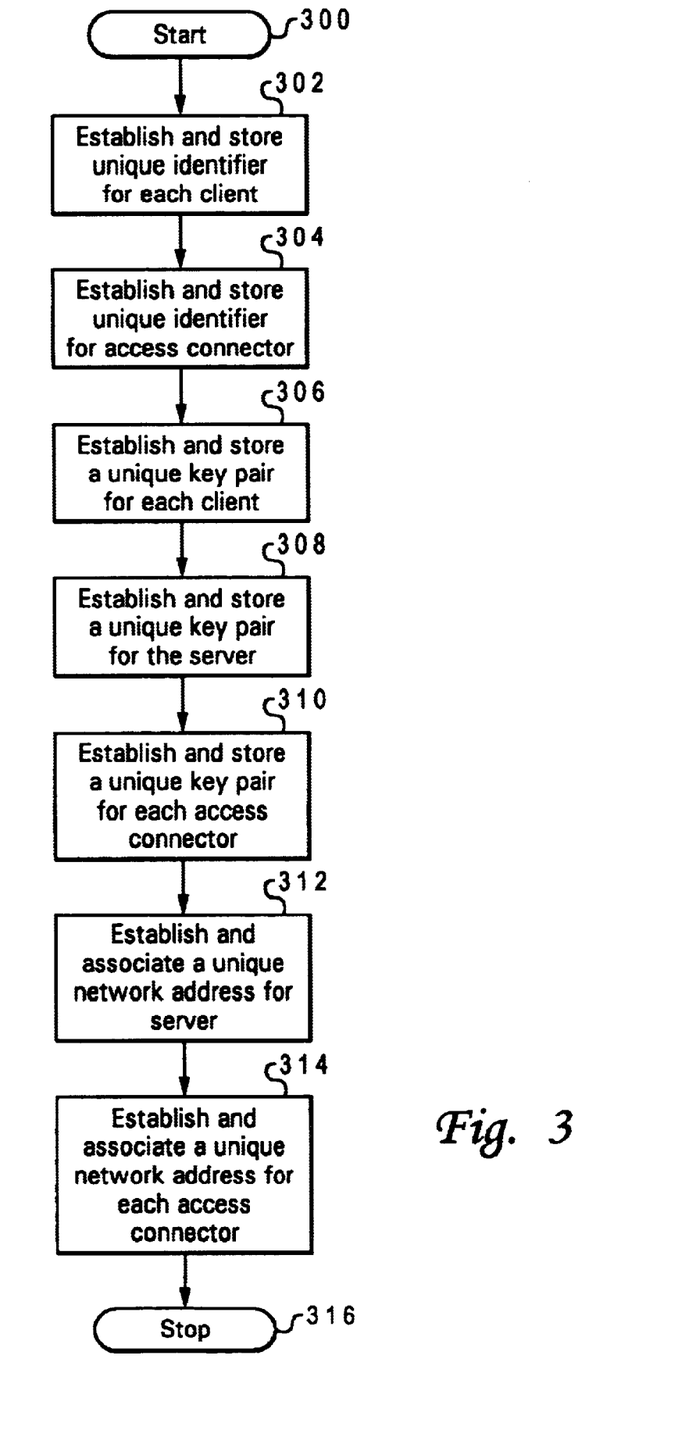
FIG. 3 illustrates a high level flow chart which depicts establishing a unique identifier for each access connector and client, and establishing encryption keys in accordance with the method and system of the present invention.

FIG. 3 illustrates a high level flow chart which depicts establishing a unique identifier for each access connector and client, and establishing encryption keys in accordance with the method and system of the present invention. The process starts as depicted at block 300 and thereafter passes to block 302 which illustrates establishing a unique identifier for each client which uniquely identifies the particular client computer system. The unique identifier is stored in protected storage 262 in the client which is identified by the unique identifier. Next, block 304 depicts establishing a unique identifier for the access connector and storing the identifier in protected storage 40 in the connector. Thereafter, block 306 illustrates establishing a unique key pair, including a public and private key, for each client. The unique key pair is stored in the client in the protected storage 262. Next, block 308 illustrates establishing a unique key pair for the server computer system. The unique key pair for the server is stored in the server in protected storage. The process then passes to block 310 which depicts establishing a unique key pair for the access connector. The unique key pair for the access connector is stored in protected storage 40 in the access connector. Thereafter, block 312 illustrates establishing and associating a unique network address with the server. Block 314, then, depicts establishing and associated a unique network address with the access connector. The process then terminates as illustrated at block 316.

Figure 4:
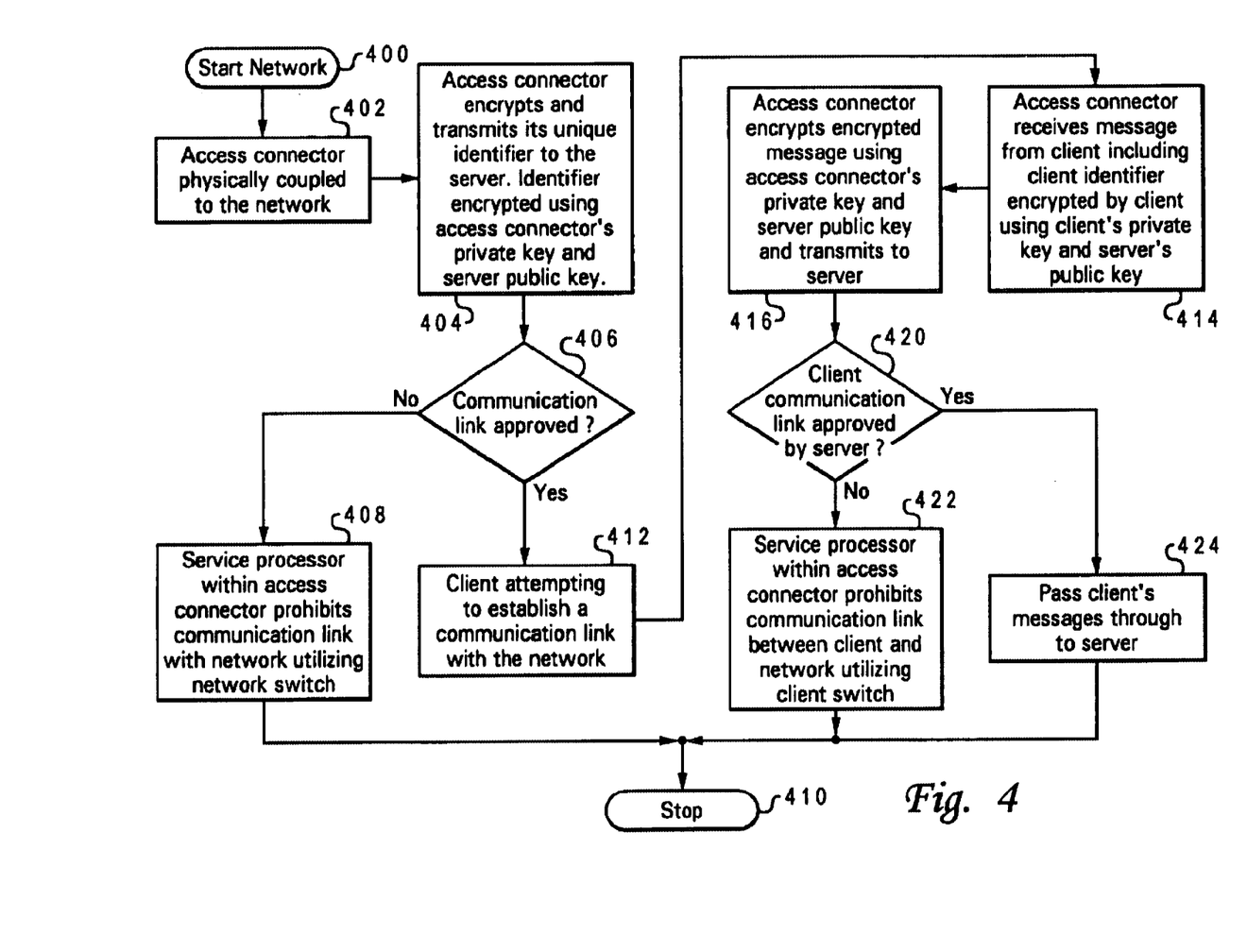
FIG. 4 depicts a high level flow chart which illustrates an access connector limiting access to a network in accordance with the method and system of the present invention.

FIG. 4 depicts a high level flow chart which illustrates an access connector limiting access to a network in accordance with the method and system of the present invention. The process starts as depicted at block 400 which illustrates the initiation of operation of the network. Thereafter block 402 illustrates the access connector establishing a physical connection with the network. Next, block 404 depicts the access connector encrypting and transmitting the access connector's unique identifier to the server. A certificate is also transmitted which includes an association between the access connector's public key and the encrypted unique identifier. The combination of signature and certificate are then encrypted with the server's public key and sent to the server.

The process passes to block 406 which depicts a determination of whether or not a communication link between the access connector and the network is approved. If a determination is made that a communication link between the access connector and the network is disapproved, the process passes to block 408 which illustrates a service processor included within the access connector prohibiting a communication link between the access connector and the network by opening a network switch. When the network switch is opened by the service processor, the access connector is no longer able to attempt to establish a communication link with the network. The process then terminates as depicted at block 410.

Referring again to block 406, if a determination is made that a communication link is approved, the process passes to block 412 which depicts a client attempting to establish a communication link with the server. The process then passes to block 414 which illustrates the access connector intercepting a message transmitted from the client to the server. The message encrypted with the server's public key that includes the client's identifier encrypted with the client's private key, the certificate associating the client public key and client identifier. Thereafter, block 416 illustrates the access connector encrypting the message which was already encrypted by the client providing an encrypted wrapper around the encrypted message. The access connector encrypts the encrypted message using the access connector's private key and the server's public key. The access connector then forwards the doubly encrypted message to the server.

The process then passes to block 420 which depicts a determination of whether or not a communication link between the client and the network is approved. If a determination is made that a communication link between the client and the network is disapproved, the process passes to block 422 which illustrates the service processor within the access connector prohibiting the client from establishing a communication link with the network by opening the client switch within the access connector. The process then terminates as depicted at block 410. Referring again to block 420, if a determination is made that a communication link connection between the client and the network is approved, the process passes to block 424 which depicts the access connector passing messages from the client to the network. The process then terminates as illustrated at block 410.

Figure 5:
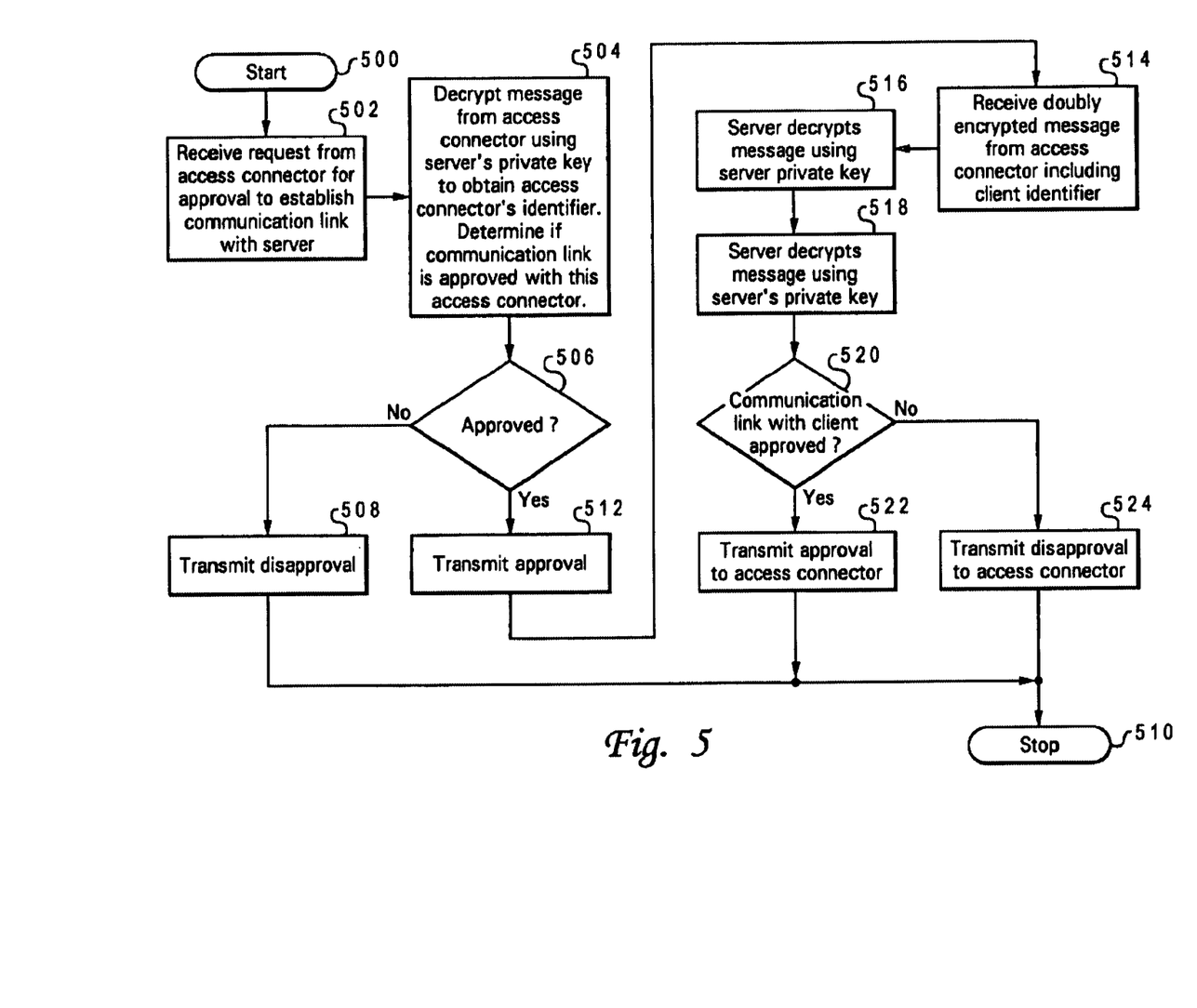
FIG. 5 illustrates a high level flow chart which depicts a server computer system determining whether to permit a particular access connector and a particular client computer system to establish a communication link with the network which is controlled by the server in accordance with the method and system of the present invention.

FIG. 5 illustrates a high level flow chart which depicts a server computer system determining whether to permit a particular access connector and a particular client computer system to establish a communication link with the network which is controlled by the server in accordance with the method and system of the present invention. The process starts as depicted at block 500 and thereafter passes to block 502 which illustrates the server computer system receiving a request from an access connector for approval to establish a communication link between the access connector and the server. The request includes the access connector's unique identifier. Next, block 504 depicts the server decrypting the message using the server's private key to obtain the access connector's unique identifier. The server determines whether the access connector identified by decrypting and validating the identifier using the certificate is permitted to establish a communication link with the network.

The process then passes to block 506 which illustrates a determination of whether or not the access connector identified by the decrypted access identifier is permitted to establish a communication link with the network. If a determination is made that the identified access connector is not permitted to establish a communication link, the process passes to block 508 which depicts the server transmitting a disapproval of the communication link to the access connector. The process then terminates as illustrated at block 510.

Referring again to block 506, if a determination is made that the identified access connector is permitted to establish a communication link with the network, the process passes to block 512 which illustrates the server transmitting an approval of the communication link to the access connector. The process then passes to block 514 which depicts the server receiving a doubly encrypted message from the access connector which includes a client identifier. Thereafter, block 516 illustrates the server decrypting the message using the server's private key. The server has now decrypted the wrapper encrypted by the access connector. The message is now the client identifier encrypted by the client. Next, block 518 depicts the server again decrypting the message using the server's private key. The server now has the decrypted client identifier. Block 520, then, illustrates a determination of whether or not the server approves a communication link between the client identified by the decrypted client identifier and the network. If a determination is made that the client identified by the client identifier is approved to establish a communication link with the network, the process passes to block 522 which depicts the server transmitting an approval to the access connector. The process then terminates as illustrated at block 510. Referring again to block 520, if a determination is made that a communication link between the client and the network is disapproved, the process passes to block 524 which depicts the server transmitting a disapproval to the access connector. The process then terminates as illustrated at block 510.

While a preferred embodiment has been particularly shown and described, it will be understood by those skilled in the art that various changes in form and detail may be made therein without departing from the spirit and scope of the present invention.

What is claimed is:

1. A method in a data processing system for providing an access connector which limits access to a network to only authorized client computer systems, said method comprising the steps of:

providing an access connector for selectively connecting a client computer to a network, said access connector having a network switch selectively connecting said access connector to said network, said access connector having a client switch for selectively connecting said access connector to said client computer;

prior to permitting said client computer to establish a client communication link with said network, said client computer authenticating itself to said access connector; and in response to said client computer being unable to authenticate itself to said access connector, said access connector disabling said client switch, whereby said client computer is unable to communicate with said access connector, thus preventing said client computer from sniffing network traffic received by said access connector, wherein said access connector is physically isolated from said client computer when said client switch is disabled, and wherein said disabling of said client switch is performed locally within said access connector.

2. The method according to claim 1, further comprising the steps of:

in response to an initiation of operation of said network, said access connector attempting to authenticate itself to said network; and in response to said access connector being unable to authenticate itself to said network, said access connector prohibiting a network communication link between said access connector and said network.

3. The method according to claim 1, further comprising the step of providing said access connector a service processor, said client switch capable of prohibiting a client communication link between said access connector and said client computer, said network switch capable of prohibiting said network communication link between said access connector and said network, said service processor controlling said client and network switches, wherein said client communication link is prohibited when said client switch is open, and further wherein said network communication link is prohibited when said network switch is open.

4. The method according to claim 3, wherein the step of said access connector prohibiting said client communication link between said client computer system and said network further comprises said service processor causing said client switch to open.

5. The method according to claim 1, further comprising the steps of:

said network being secured by a firewall; and said access connector being provided inside said firewall, wherein access to said network through said access connector is not controlled by said firewall.

6. The method according to claim 1, further comprising the steps of:

establishing a unique access connector identifier identifying said access connector;

in response to said initiation of operation of said network, said access connector transmitting said access connector identifier to said server; and said server utilizing said access connector identifier to determine whether said access connector is authenticated to said network.

7. The method according to claim 1, further comprising the steps of:

establishing a unique client identifier identifying said client computer;

prior to permitting said client computer to establish said client communication link with said network, said client computer transmitting said client unique identifier to said server; and said server utilizing said client identifier to determine whether said client computer is authenticated to said network.

8. The method according to claim 1, further comprising the steps of:

establishing a client encryption device within said client computer; and establishing an access connector encryption device within said access connector.

9. The method according to claim 6, further comprising the step of said access connector encryption device encrypting said access connector identifier prior to said access connector transmitting said access connector identifier to said server.

10. The method according to claim 7, further comprising the step of said client encryption device encrypting said client identifier prior to said client computer transmitting said client identifier to said server.

11. The method according to claim 10, further comprising the steps of:

said access connector intercepting said encrypted client identifier transmitted by said client computer to said server; and said access connector encryption device encrypting said encrypted client identifier and forwarding said doubly encrypted client identifier to said server.

12. A computer network including a server and an access connector which limits access to said network to only authorized client computers, said computer network, said computer network comprising:

an access connector capable of selectively connecting a client computer system to said computer network, said access connector having a client switch for selectively connecting said access connector to said client computer and a network switch for selectively connecting said access connector to said network, wherein prior to permitting said client computer to establish a client communication link with said network, said client computer system authenticating itself to said access connector, and in response to said client computer being unable to authenticate itself to said access connector, said access connector disabling said client switch, whereby said client computer is unable to communicate with said access connector, thus preventing said client computer from sniffing network traffic received by said access connector, wherein said access connector is physically isolated from said client computer system when said client switch is disabled, and wherein said disabling of said client switch is performed locally within said access connector.

13. The computer network according to claim 12, further comprising:

responsive to an initiation of operation of said network, means for said access connector to attempt to authenticate itself to said network, and in response to said access connector being unable to authenticate itself to said network, said access connector prohibiting a network communication link between said access connector and said network.

14. The computer network according to claim 12, said access connector further comprising a service processor, said client switch capable of prohibiting a client communication link between said access connector and said client computer, said network switch capable of prohibiting said network communication link between said access connector and said network, said service processor for controlling said client and network switches, wherein said client communication link is prohibited when said client switch is open, and further wherein said network communication link is prohibited when said network switch is open.

15. The computer network according to claim 14, further comprising said service processor being capable of causing said client switch to open to prohibit said client communication link between said client computer system and said network.

16. The computer network according to claim 12, further comprising:
   a firewall for securing said computer network; and
   said access connector being included inside said firewall, wherein access to said computer network through said access connector is not controlled by said firewall.

17. The computer network according to claim 12, further comprising:
   said access connector being capable of establishing a unique access connector identifier identifying said access connector;
   in response to said initiation of operation of said network, said access connector transmitting said access connector identifier to said server computer system; and
   said server utilizing said access connector identifier to determine whether said access connector is authenticated to said computer network.

18. The computer network according to claim 12, further comprising:
   said client computer system being capable of establishing a unique client identifier identifying said client computer;
   prior to permitting said client computer to establish said client communication link with said network, said client computer transmitting said client unique identifier to said server; and
   said server utilizing said client identifier to determine whether said client computer is authenticated to said network.

19. The computer network according to claim 12, further comprising:
   a client encryption device included within said client computer; and
   an access connector encryption device included within said access connector.

20. The computer network according to claim 19, further comprising said access connector encryption device being capable of encrypting said access connector identifier prior to said access connector transmitting said access connector identifier to said server.

21. The computer network according to claim 19, further comprising said client encryption device executing code for encrypting said client identifier prior to said client computer transmitting said client identifier to said server.

22. The computer network according to claim 21, further comprising:
   said access connector capable of intercepting said encrypted client identifier transmitted by said client computer to said server; and
   said access connector encryption device executing code for encrypting said encrypted client identifier and forwarding said doubly encrypted client identifier to said server.

23. An access connector which limits access to a network to only authorized client computer systems, said access connector comprising:
   a network switch selectively connecting said access connector to a network;
   a client switch for selectively connecting said access connector to said client computer;
   authenticating logic for authenticating said client computer to said access connector; and
   connection logic that, responsive to said client computer failing to be authenticated to said access connector, disables said client switch, whereby said client computer is unable to communicate with said access connector, thus preventing said client computer from sniffing network traffic received by said access connector, wherein said access connector is physically isolated from said client computer when said client switch is disabled, and wherein said disabling of said client switch is performed locally within said access connector.

* * * * *